Dec. 9, 1924.

P. B. LASKEY

METHOD OF MAKING CANDY

Original Filed Aug. 1, 1922

1,518,587

Inventor.
Philip B. Laskey
by Heard Smith & Tennant.
Attys.

Patented Dec. 9, 1924.

1,518,587

UNITED STATES PATENT OFFICE.

PHILIP B. LASKEY, OF MARBLEHEAD, MASSACHUSETTS, ASSIGNOR TO THE CHOCOLATE SPONGE CO., INC., OF NEW YORK, N. Y., A CORPORATION OF NEW YORK.

METHOD OF MAKING CANDY.

Application filed August 1, 1922, Serial No. 579,002. Renewed November 8, 1923.

*To all whom it may concern:*

Be it known that I, PHILIP B. LASKEY, a citizen of the United States, and resident of Marblehead, county of Essex, State of Massachusetts, have invented an Improvement in Methods of Making Candy, of which the following description, in connection with the accompanying drawing, is a specification, like characters on the drawing representing like parts.

This invention relates to a method of making porous candy and particularly porous candy of that type which has holes or passages extending longitudinally thereof from end to end.

The improved method is carried out by extruding through a die a plurality of separate streams of candy material in spaced relation and expanding said streams laterally after they have issued from the die so as to bring them into contact with each other, thus causing them to adhere or coalesce. This is done in such a way as to leave spaces between the separate streams thus forming a length of candy having pores or cells extending longitudinally thereof. While the streams may have various cross-sectional shapes I find that streams of tubular shapes have the advantage because the tubular streams can be expanded radially or laterally to bring them into contact.

This expansion of the individual tubes can conveniently be secured by introducing air under pressure into the tubular streams after they are formed so that after the tubular streams leave the die of the extruding machine the air pressure within them will cause them to expand laterally into contact with each other.

In order to give an understanding of my invention I have illustrated in the drawings more or less diagrammatically an apparatus by which the method may be carried out, but I wish it to be understood that the drawings are merely for illustrative purpose and are not intended to in any way limit the application of the method in practice.

In the drawings, Fig. 1 is a vertical sectional view of an apparatus by which my improved method may be carried out.

Figure 1:
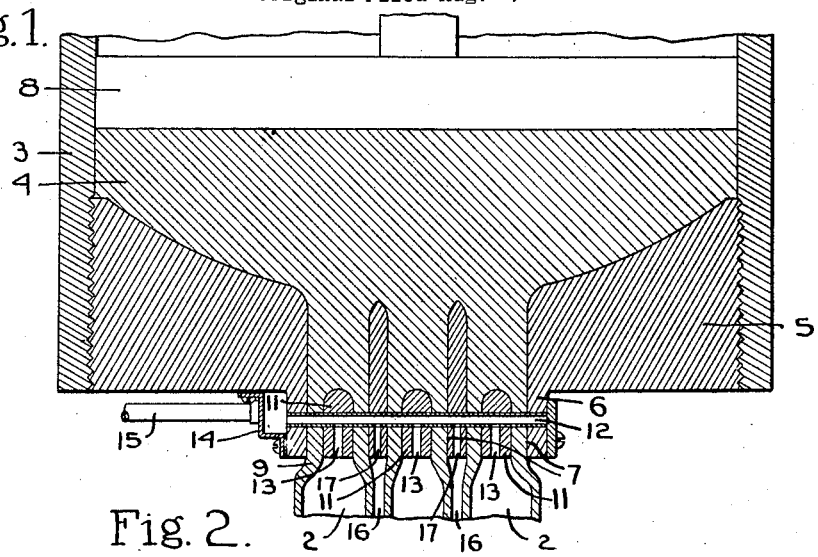
Figure 2:
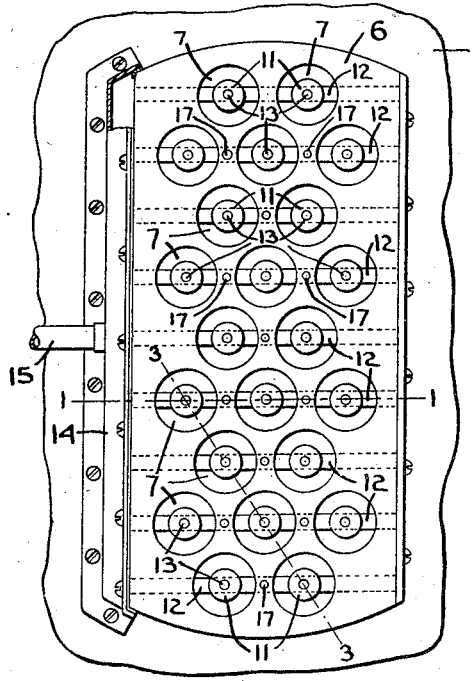
Fig. 2 is a bottom plan view of the die.
Figure 4:
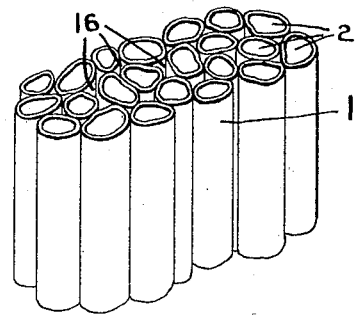
Fig. 4 is a perspective sectional view illustrating the candy structure produced according to the method.

Referring first to Fig. 4 1 indicates a piece of porous candy which has openings or passages 2 extending longitudinally thereof.

In making candy of this type by my improved method I first form a plurality of individual streams of candy in spaced relation to each other and then I expand the streams radially or laterally to cause the walls of adjacent streams to contact with each other. These candy streams can conveniently be formed in an extruding machine by extruding the candy material through a plurality of apertures in a die, each aperture delivering a stream of candy material, said streams being delivered in spaced relation. After the streams are delivered from the extruding machine they are expanded laterally into contact with each other and as the candy material is in a soft and tacky condition at this time the expanded streams will adhere or coalesce thus forming a practically integral candy structure.

The candy streams are of such a shape that when they are expanded into contact with each other spaces are formed between the streams so that the thinnest candy structure is a cellular structure with holes or cells running longitudinally thereof. In the preferred method of practising my invention I form the individual candy streams in tubular formation and the expanding operation results in enlarging the diameter of the tubes after they are formed so as to bring them into contact with each other.

In the drawings wherein I have shown more or less diagrammatically a device suitable for carrying out my improved process, 3 indicates a container adapted to contain candy material 4, the end of the container being provided with a head 5 having a die 6 provided with a plurality of separate apertures 7 through which the candy material 4 is extruded by some suitable means, such as a plunger 8. The candy material will issue from the apertures 7 in a plurality of separate streams 9 of candy which are spaced from each other.

While the apertures 7 may have various shapes without departing from the invention I prefer to use a die having annular apertures which form tubular streams 9. After these tubular streams or tubes 9 of candy are delivered from the die 6 they are expanded radially to bring the walls thereof into contact as shown at 10. This expanding of the separate tubes not only brings them into adhesive contact but also thins the walls of the tubes somewhat.

The annular apertures 7 are preferably of a transverse dimension greater than the desired thickness of the walls of the separate tubes in the finished piece of candy and the reduction in the diameter of the walls is accomplished by the expanding of the candy tubes radially. This expanding is provided for by delivering compressed air into each candy tube as it is formed.

Figure 3:
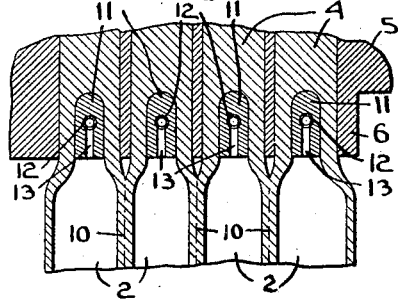
Fig. 3 is a section on the line 3—3, Fig. 2.

The core or center 11 within each annular aperture 7 is supported on a tube 12 which extends transversely of the die 6 and each core is provided with a duct 13 which communicates with the interior of its supporting tube 12. The tubes 12 all communicate with a manifold 14 supported by the die and which is connected with a source of compressed air supply through a pipe 15. With this arrangement it will be readily understood that as the candy material is forced through the annular apertures 7 of the die 6 thereby forming individual candy tubes 9, compressed air will be delivered to the interior of each candy tube through the pipes 12 and ducts 13 and the pressure of the air thus delivered is intended to be sufficient to expand each candy tube radially after it leaves the die as indicated in Figs. 1 and 3, such expanding continuing until the walls of adjacent candy tubes contact with each other.

The candy material is, of course, plastic and more or less tacky while it is being forced through the die and the expanding of the individual tubes takes place while the candy material is still in such condition and before it cools. Therefore, as soon as the expanded tubes contact with each other they will adhere to each other so that when the candy is cool an integral structure is provided having the pores or holes 2 extending longitudinally thereof.

If desired I may also introduce air under pressure into the spaces 16 between adjacent candy tubes and this is accomplished by providing ports 17 between certain adjacent annular apertures 7 and which communicate with the pipes 12 so that compressed air will be delivered not only through the ducts 13 but also through the ports or ducts 17.

As the candy tubes are delivered from the annular apertures 7 and are expanded they will assume a more or less irregular shape thus producing a final candy structure of more or less irregular form and having more or less irregular pores or openings 2 extending therethrough. The irregularity of the shape and of the passages is also enhanced by the delivery of the compressed air through the ports 17 into the spaces 16 between adjacent tubes so that the final structure is liable to have more or less irregularity both in the shape of the completed candy stick and in the shape and size of the pores or openings 2 therethrough. It will be understood that the candy structure formed by expanding the candy tubes 9 into contact with each other may be drawn longitudinally to reduce its cross-sectional area as usual in candy-making processes. The presence of the air in the tubes and in the spaces between the tubes will maintain the cellular structure during such drawing or pulling operation.

I claim:

1. The process of making porous candy which consists in forming a plurality of separate candy tubes in spaced parallel relation, and expanding said tubes radially to cause the walls of adjacent tubes to contact and adhere together.

2. The process of making porous candy which consists in forming from plastic candy material a plurality of separate candy tubes in spaced parallel relation, and while said tubes are still plastic and tacky expanding them radially to cause the walls of adjacent tubes to contact and adhere together.

3. The process of making porous candy which consists in forcing candy material through a plurality of adjacent but independent annular openings thereby to form a plurality of independent candy tubes which have a spaced relation, and then expanding said tubes radially to bring them into contact with each other and cause them to adhere together.

4. The process of making porous candy which consists in extruding through a die a plurality of separate streams of candy material in spaced relation and expanding the streams transversely after they have been delivered from the die to bring them into contact with each other.

5. The process of making porous candy which consists in extruding through a die a plurality of tubular streams of candy material in spaced relation and after said streams are delivered from the die expanding them radially into contact with each other.

In testimony whereof, I have signed my name to this specification.

PHILIP B. LASKEY